(12) United States Patent
Bae

(10) Patent No.: US 7,694,799 B2
(45) Date of Patent: Apr. 13, 2010

(54) AUTOMATIC PALLET EXCHANGER OF MACHINE TOOL

(75) Inventor: Jae Yong Bae, Gyeongsangnam-do (KR)

(73) Assignee: Doosan Infracore Co., Ltd., Dongu-gu, Incheon (KR)

( * ) Notice: Subject to any disclaimer, the term of this patent is extended or adjusted under 35 U.S.C. 154(b) by 109 days.

(21) Appl. No.: 11/297,059

(22) Filed: Dec. 8, 2005

(65) Prior Publication Data

US 2006/0151287 A1    Jul. 13, 2006

(30) Foreign Application Priority Data

Dec. 29, 2004 (KR) ........................ 10-2004-0115510
Dec. 29, 2004 (KR) ........................ 10-2004-0115511

(51) Int. Cl.
    *B65G 47/90*      (2006.01)

(52) U.S. Cl. .............. 198/346.1; 198/345.1; 198/345.3; 198/465.1

(58) Field of Classification Search .............. 198/346.1, 198/414, 465.1, 465.3, 817, 861.1, 345.1
See application file for complete search history.

(56) References Cited

U.S. PATENT DOCUMENTS 1,502,635 A * 7/1924 Jaeger ........................ 53/285
4,797,052 A * 1/1989 Ohta et al. ................ 414/744.3
5,598,859 A * 2/1997 Kronseder .................... 134/62
5,992,608 A * 11/1999 Ahn ........................ 198/346.1
6,148,988 A * 11/2000 Lin et al. ................. 198/346.1
6,647,605 B2 * 11/2003 Hiramoto et al. ............ 29/33 P

FOREIGN PATENT DOCUMENTS

JP      2002-254266      9/2002

* cited by examiner

*Primary Examiner*—Gene Crawford
*Assistant Examiner*—Kavel P Singh
(74) *Attorney, Agent, or Firm*—Greenberg Traurig, LLP

(57) ABSTRACT

Disclosed herein is an automatic pallet exchanger of a machine tool, which can exactly decide a position of a pallet exchanging operation, and which can improve stability in operation. The automatic pallet exchanger includes an APC driving shaft (30) rotatably and elevatably standing on an APC body (20); an APC arm (40) supported on the APC shaft (30) for exchanging pallets of a processing area and a waiting area; rotating means for rotating the APC driving shaft (30); a cylinder (80) inserted on the APC driving shaft (30) and fixed on the APC body; a piston mounted on the APC driving shaft (30) for elevating the APC driving shaft (30) according to hydraulic pressure direction within the cylinder (80); a stopper (100) located within a fixed radius from the APC driving shaft (30) and fixed on the APC arm (40); and a pair of stop bolts (110A, 110B) fixed on the APC body (20) to stop the rotation of the APC arm (40) by contacting with the stopper (100) whenever the APC arm (40) is rotated at an angle of 180°.

6 Claims, 9 Drawing Sheets

AUTOMATIC PALLET EXCHANGER OF MACHINE TOOL

BACKGROUND OF THE INVENTION

1. Field of the Invention

The present invention relates to an automatic pallet exchanger of a machine tool, and more particularly, to an automatic pallet exchanger of a machine tool, which can exactly decide a position of a pallet exchanging operation, and which can improve stability in operation.

2. Background Art

In general, a pallet located in a processing area and a pallet located in a waiting area are exchanged with each other whenever processing is finished. Therefore, a workpiece put on the pallet located in the processing area is returned to the waiting area after completion of the processing in the processing area, and at the same time, a workpiece put on the pallet located in the waiting area is returned to the processing area. To fulfill such work for exchanging the workpieces with each other, a machine tool has an APC (Automatic Pallet Changer).

First of all, the terminology described in the present application is defined as below:

'Elevating' means a motion to ascend and descend.

FIGS. 8 and 9 are structural views of a conventional automatic pallet exchanger of a machine tool. FIG. 9 is a sectional view taken along the line of B-B of FIG. 8.

As shown in FIGS. 8 and 9, to exchange a first pallet (P1) located in a processing area 10 and a second pallet (P2) located in a waiting area 11 with each other, an APC arm 40 performs four motions, such as ascent, rotation, stop and descent.

That is, the APC arm 40 performs the steps of ascending a piston 90 in a cylinder 80 with hydraulic pressure, rotating an APC driving shaft 30 standing on an APC body 20 by the medium of a pinion gear 50 by rectilinearly moving a rack 60 by pressure oil induced into an index cylinder 70, stopping the APC driving shaft 30 by a stopper 72 when the APC driving shaft 30 is rotated at an angle of 180 degree, and finishing the pallet exchange by descending the piston 90. Therefore, the first pallet (P1) located in the processing area is transferred to the waiting area, and the second pallet (P2) located in the waiting area is transferred to the processing area, and thereby, the workpieces are exchanged with each other.

As described above, when the rotational motion of the APC arm 40 is stopped by the stopper 72 after the rectilinear motion of the rack 60 is carried out by the pinion gear 50 engaged to the APC driving shaft 30, there occurs a backlash between the engaged teeth of the rack 60 and the pinion gear 50. Such backlash induces backward rotation of the APC arm 40 or generates vibration, and thereby, interrupts a correct position decision and deteriorates durability of APC driving components.

Moreover, in the conventional APC device, only one guide for guiding the ascending motion of the APC arm 40 is mounted at one place. That is, as shown in FIG. 8, the APC arm 40 rises depending on the one guide 200 mounted at one place between the cylinder 80 and the elevating cylinder housing 92, and thereby, the following problem is caused.

That is, as shown in FIG. 8, when biased load is applied to the APC arm 40 by the workpiece (W), there occurs a partial side wear on the guide 200 since the load is concentrated on one side, and thereby, the entire APC driving part is leaned so as to deteriorate a degree of processing.

SUMMARY OF THE INVENTION

Accordingly, the present invention has been made to solve the above disadvantages of the prior arts, and it is an object of the present invention to provide an automatic pallet exchanger of a machine tool, which can exactly decide a position of a pallet exchanging operation without gear backlash, and increase bearing power for guiding an ascending operation of an APC arm, thereby improving stability and mechanical degree of the APC arm.

To accomplish the above objects, according to the present invention, there is provided an automatic pallet exchanger of a machine tool comprising: an APC body; an APC driving shaft rotatably and elevatably standing on the APC body; rotating means mounted on the APC body for rotating the APC driving shaft; an APC arm mounted on the APC driving shaft concentrically and rotating integrally with the APC driving shaft, the APC arm having a pallet seated on the front end portion thereof; elevating means having an end portion fixed on the APC arm for vertically elevating the APC driving shaft; a stopper fixed beneath the APC arm; and stopping means fixed on the APC body to stop the rotation of the APC arm by being in contact with the stopper.

The stopping means includes stopper blocks fixed on the APC body and stop bolts fastened to the stopper blocks by nuts for a position control.

The stopper blocks includes injecting means for injecting fluid in order to remove foreign substances stained on contact portions of the stopper and the stop bolts.

Here, the injecting means is an air nozzle.

The elevating means comprises: a piston fit on the outer circumference of the APC driving shaft and elevating integrally with the APC driving shaft; a cylinder having an end portion inserted on the outer circumference of the piston and the other end portion fixed on the APC body; and an elevating cylinder housing having an end portion inserted on the outer circumference of the cylinder and surrounding the cylinder and the APC driving shaft and the other end fixed on the APC arm, wherein the cylinder housing performs the elevating motion integrally with the APC arm and the APC driving shaft.

The APC driving shaft further comprises rotation supporting means, and the rotation supporting means includes: an upper indent bearing interposed between the outer circumference of the elevation cylinder and the inner circumference of the cylinder housing; and a lower bearing device having the inner circumference inserted on the outer circumference of the lower portion of the APC driving shaft and the outer circumference supporting the lower end portion of the APC driving shaft in a state where it is inserted on the APC body.

The lower bearing device comprises: a housing bracket located beneath the APC driving shaft and protrudingly fixed on the APC body; a bearing housing fixed on the housing bracket; and a lower indent bearing interposed between the inner circumference of the bearing housing and the outer circumference of the APC driving shaft.

The APC driving shaft further comprises abrasion preventing means for preventing abrasion of the APC driving shaft by friction with the lower indent bearing when the APC driving shaft is rotated and elevated, said abrasion preventing means is a cylindrical guide interposed between the inner circumference of the lower indent bearing and the outer circumference of the APC driving shaft.

In another aspect, the present invention provides an automatic pallet exchanger of a machine tool comprising: an APC body; an APC driving shaft rotatably and elevatably standing on the APC body; rotating means mounted on the APC body for rotating the APC driving shaft; a piston inserted on the outer circumference of the APC driving shaft and elevating integrally with the APC driving shaft; a cylinder having an end portion inserted on the outer circumference of the piston and the other end portion fixed on the APC body; and an elevating cylinder housing having an end portion inserted on the outer circumference of the cylinder and surrounding the cylinder and the APC driving shaft and the other end portion fixed on the APC arm; an APC arm mounted on the APC driving shaft concentrically and rotating integrally with the APC driving shaft, the APC arm having a pallet seated on the front end portion thereof; an upper indent bearing interposed between the outer circumference of the elevation cylinder and the inner circumference of the cylinder housing; and a lower bearing device having the inner circumference inserted on the outer circumference of the lower portion of the APC driving shaft and the outer circumference supporting the lower end portion of the APC driving shaft in a state where it is inserted on the APC body.

The lower bearing device comprises: a housing bracket located beneath the APC driving shaft and protrudingly fixed on the APC body; a bearing housing fixed on the housing bracket; and a lower indent bearing interposed between the inner circumference of the bearing housing and the outer circumference of the APC driving shaft.

The APC driving shaft further comprises abrasion preventing means for preventing abrasion of the APC driving shaft by friction with the lower indent bearing when the APC driving shaft is rotated and elevated, and the abrasion preventing means is a cylindrical guide interposed between the inner circumference of the lower indent bearing and the outer circumference of the APC driving shaft.

The APC arm further comprises: a stopper fixed beneath the APC driving shaft; and stopping means being in contact with the stopper and fixed on the APC body to stop the rotation of the APC arm at a fixed position.

The stopping means comprises stopper blocks fixed on the APC body and stop bolts fastened to the stopper blocks by nuts for a position control.

The stopper blocks includes air nozzles for injecting fluid in order to remove foreign substances stained on contact portions of the stopper and the stop bolts.

The indent bearing is one of an indent type, a perforate type, a seal mounting type, a groove type and a filling type.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will be now made in detail to the preferred embodiment of the present invention with reference to the attached drawings.

Figure 1:
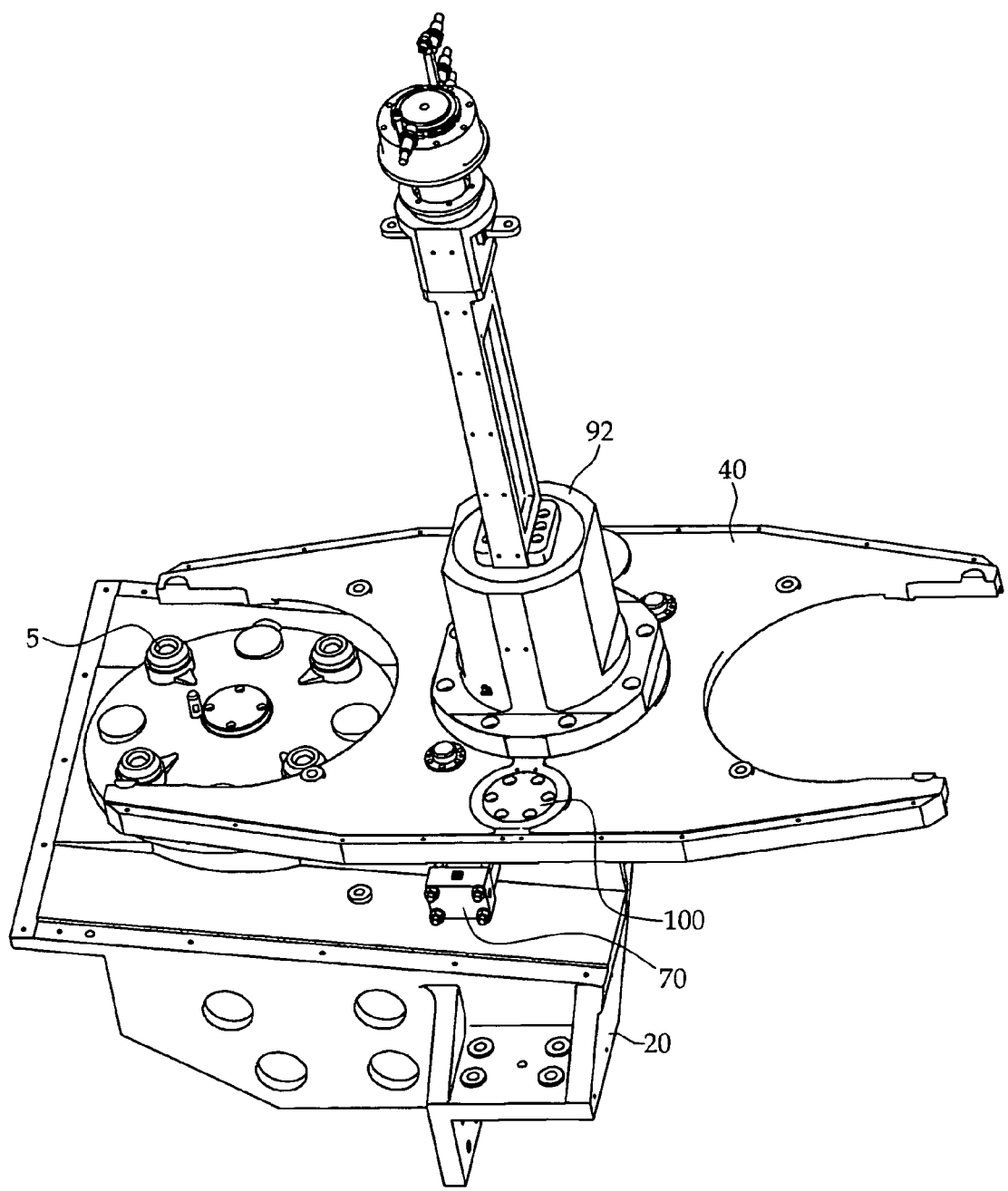
FIG. 1 is a perspective view of an automatic pallet exchanger of a machine tool according to the present invention.
Figure 2:
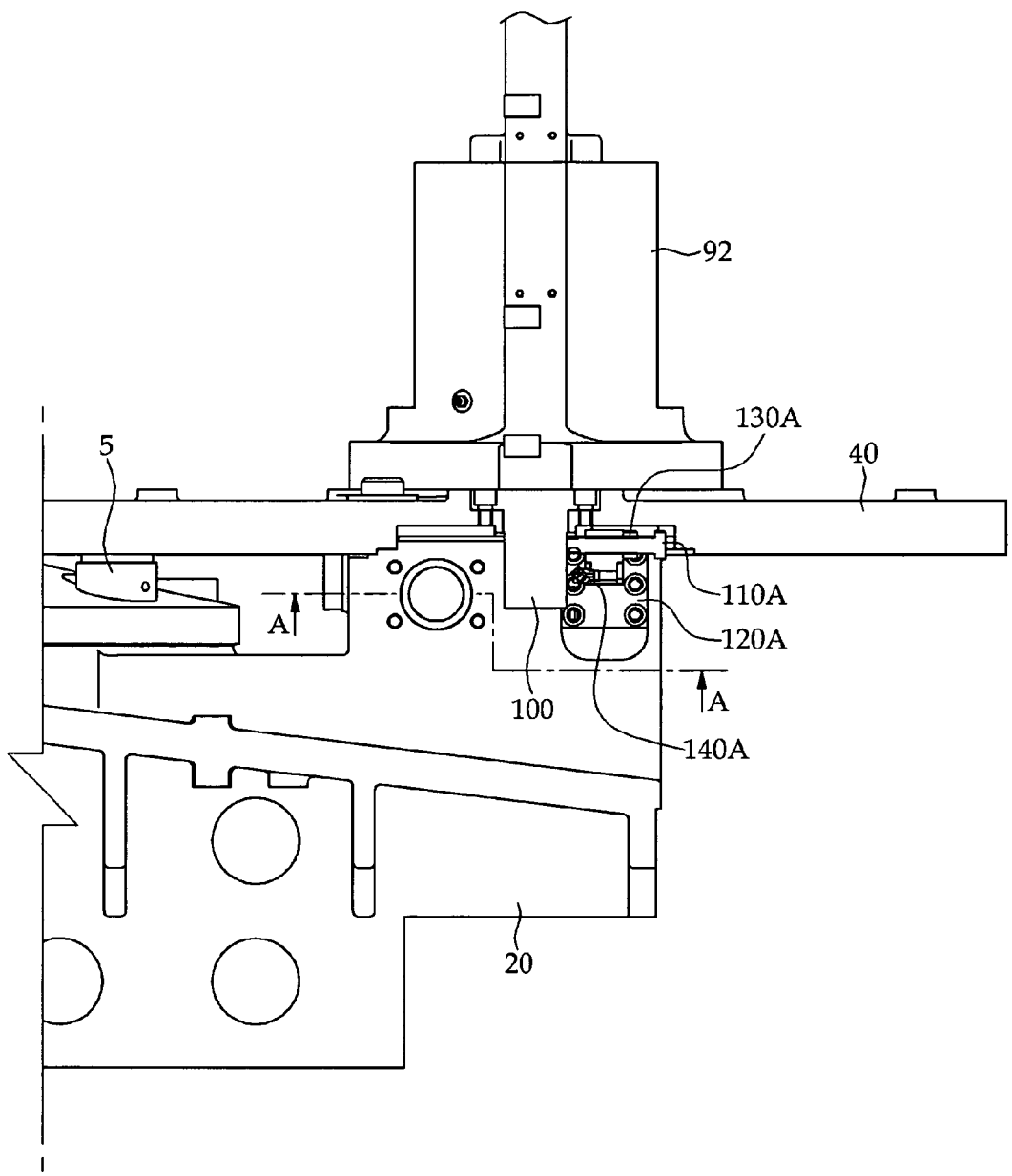
FIG. 2 is a front view of FIG. 1.
Figure 3:
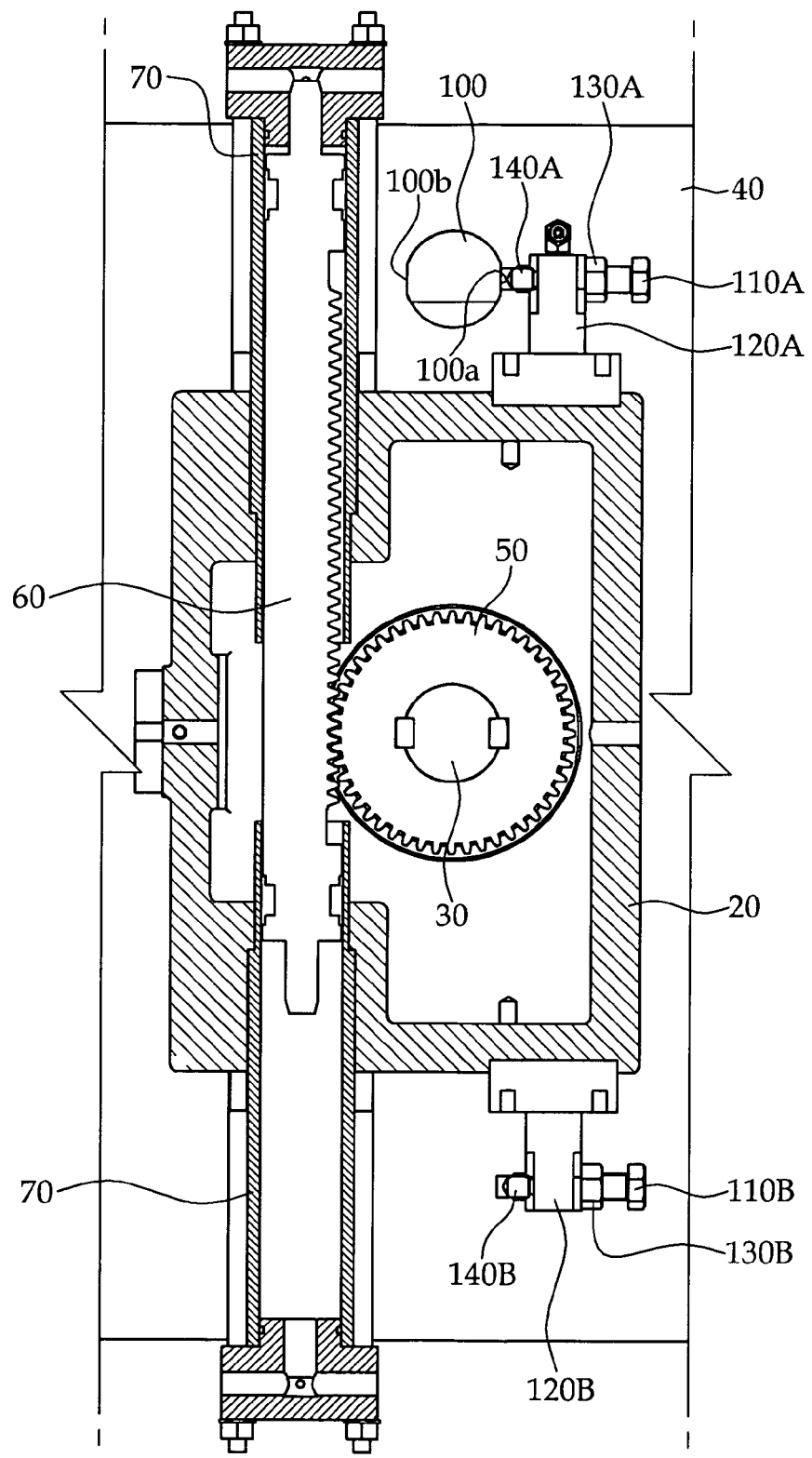
FIG. 3 is a sectional view taken along the line of A-A of FIG. 2.
Figure 4:
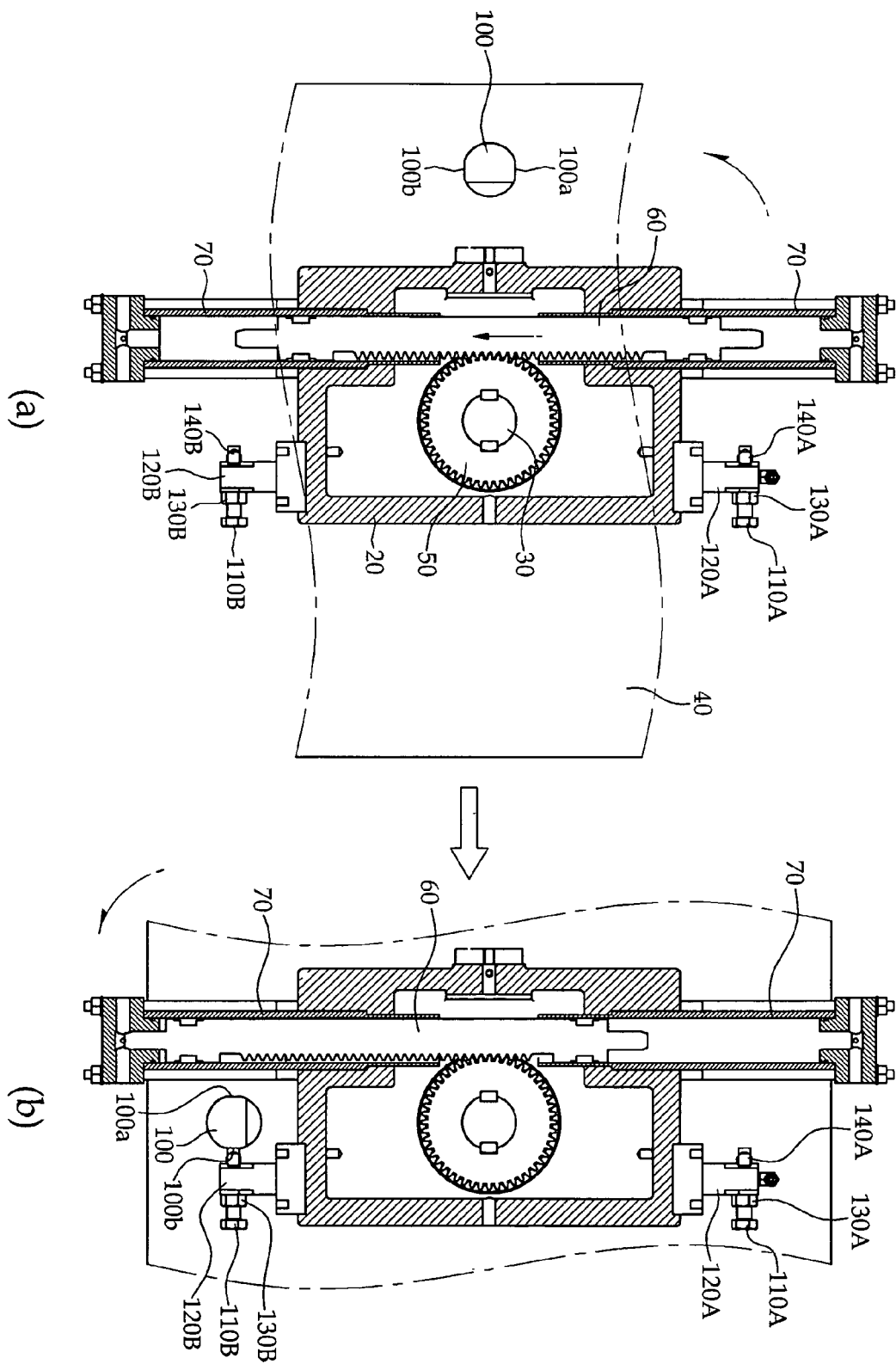
FIG. 4a is a view showing a 180 degree rotational state of an APC arm by an operation of an index cylinder according to the present invention.
FIG. 4b is a view showing a 90 degree rotational state of the APC arm by the operation of the index cylinder according to the present invention.
Figure 5:
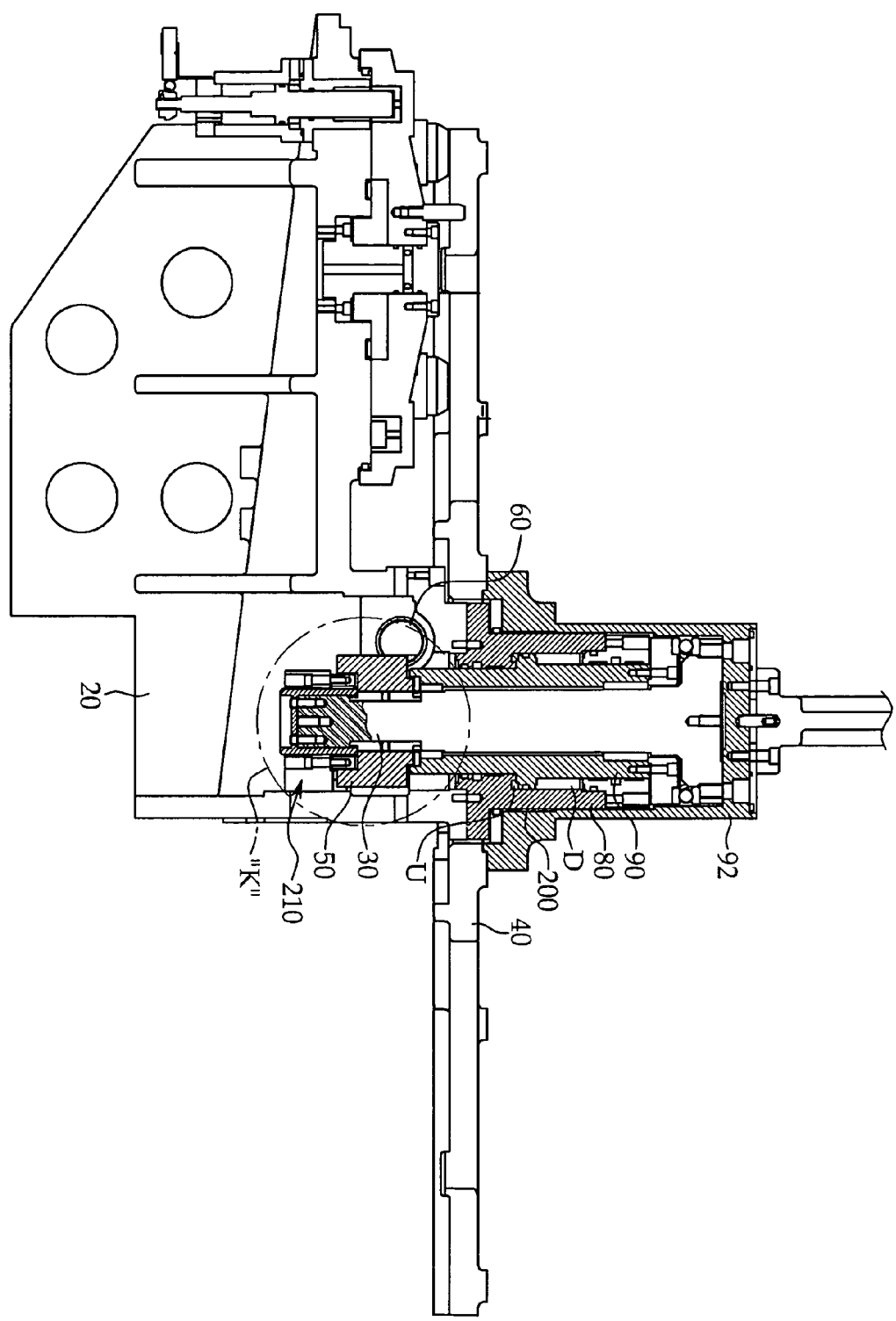
FIG. 5 is a vertically sectional view of the automatic pallet exchanger of the machine tool according to the present invention.

FIG. 1 is a perspective view of an automatic pallet exchanger of a machine tool according to the present invention, FIG. 2 is a front view of FIG. 1, FIG. 3 is a sectional view taken along the line of A-A of FIG. 2, FIG. 4a is a view showing a 180 degree rotational state of an APC arm by an operation of an index cylinder according to the present invention, FIG. 4b is a view showing a 90 degree rotational state of the APC arm by the operation of the index cylinder according to the present invention, and FIG. 5 is a vertically sectional view of the automatic pallet exchanger of the machine tool according to the present invention.

Figure 8:
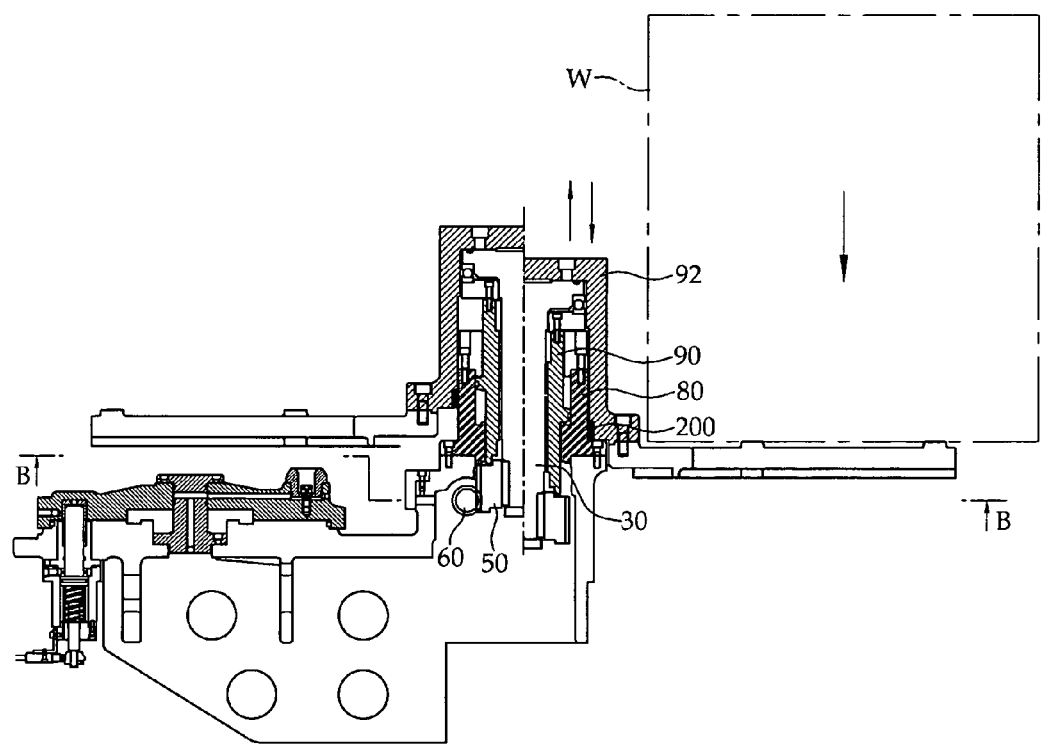
FIG. 8 is a structural view of a conventional automatic pallet exchanger of the machine tool, showing a state where biased load is applied.
Figure 9:
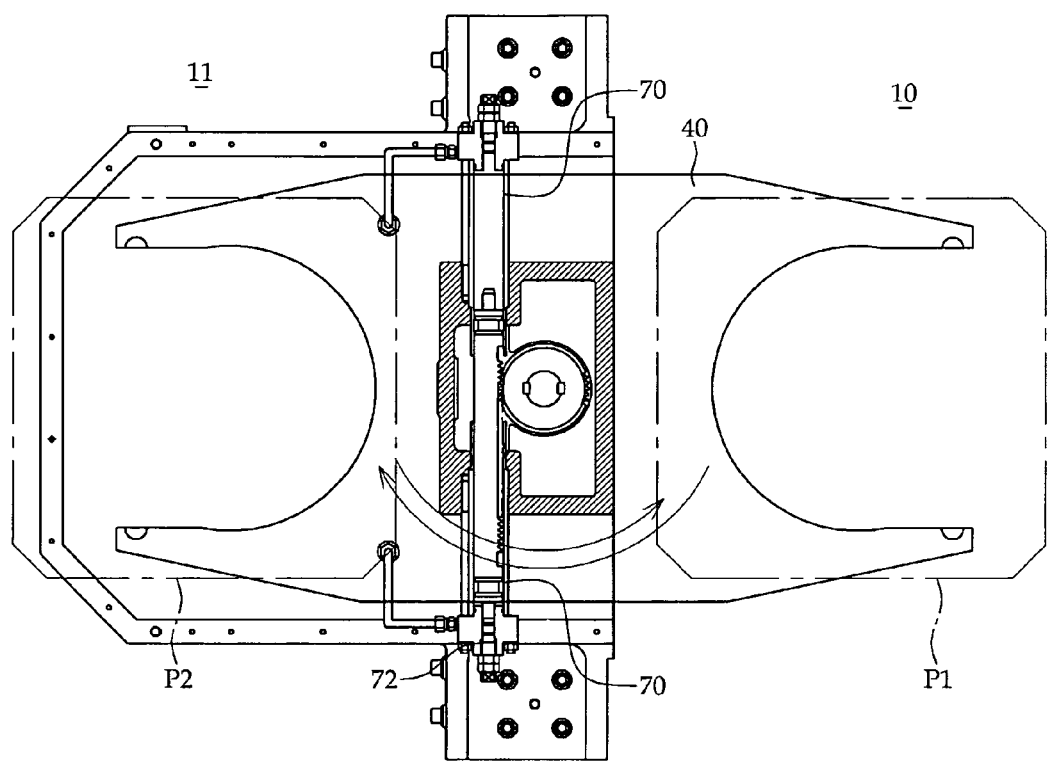
FIG. 9 is a sectional view taken along the line of B-B of FIG. 8.

Here, the same parts of the automatic pallet exchanger of the machine tool according to the present invention as the prior art shown in FIG. 8 will have the same reference numerals as the prior art shown in FIG. 8.

As shown in FIGS. 1 and 5, the automatic pallet exchanger of the machine tool according to the present invention includes an APC body 20 and an APC driving shaft 30 rotatably and elevatably standing on the APC body 20.

The APC body 20 includes rotating means for rotating the APC driving shaft 30, and an APC arm 40 integrally rotated with the APC driving shaft 30 in a state where a pallet is seated thereon. Furthermore, the APC arm 40 is mounted on the APC body 20 and connected to elevating means for vertically elevating the APC arm 40.

The rotating means for rotating the APC driving shaft 30, as shown in FIG. 3, comprises a pinion gear 50 mounted on the lower end portion of the APC driving shaft 30, a rack 60 engaged with the pinion gear 50, and an index cylinder 70 mounted on the APC body 20 for moving the rack 60 forward and backward in a perpendicular direction to the APC driving shaft 30.

The elevating means for vertically elevating the APC arm 40 includes a piston 90 inserted on the outer circumference of the APC driving shaft 30 and elevating integrally with the APC driving shaft 30, a cylinder 80 having an end portion inserted on the outer circumference of the piston 90 and the other end portion fixed on the APC body 20, and an elevating cylinder housing 92 having an end portion inserted on the outer circumference of the cylinder 80 and surrounding the cylinder 80 and the APC driving shaft 30 and the other end portion fixed on the APC arm 40. The elevating cylinder housing 92 elevates integrally with the APC arm 40 and the APC driving shaft 30.

As shown in FIGS. 1 to 3, a stopper 100 is fixed at one place of the bottom surface of the APC arm 40 and located within a fixed radius from the center of the APC driving shaft 30.

Therefore, the stopper 100 is rotated integrally with the APC arm 40. When the APC arm 40 is rotated at an angle of 180°, also the stopper 100 is rotated at the same angle and changes its location.

As stopping means for stopping the rotation of the APC arm 40 by contacting with the stopper 100 whenever the APC arm 40 is reciprocally rotated at the angle of 180°, a pair of stop bolts 110A and 110B are fixed on the APC body 20.

Preferably, the stop bolts 110A and 110B are respectively screwed to stopper blocks 120A and 120B fixed on the APC body 20 in such a way as to control their positions, and nuts 130A and 130B are respectively screwed to the stop bolts 110A and 110B.

Therefore, the stop bolts 110A and 110B are moved according to their rotational direction, and the controlled position of the stop bolts 110A and 110B are fixed on the stopper blocks 120A and 120B by fastening force of the nuts 130A and 130B.

Air nozzles 140A and 140B as injection means for removing foreign substances adhered on a contact portion between the stopper 100 and the stop bolts 110A and 110B via pneumatic pressure are mounted on the stopper bolts 120A and 120B. At this time, an injection direction of the air nozzles 140A and 140B directs the contact surfaces of the stopper 100 and the stop bolts 110A and 110B, and the air nozzles 140A and 140B are connected to a pneumatic pressure source to discharge compressed air.

Meanwhile, the APC machine of the present invention stably supports the rotating and elevating operations of the APC arm 40 at two places. That is, the present invention includes rotation supporting means mounted at the upper and lower portions of the APC arm 40.

As shown in FIG. 5, the upper supporting means is an upper indent bearing 200 interposed between the outer circumference of the cylinder 80 and the inner circumference of the elevating cylinder housing 92 connected to the APC arm 40.

The lower supporting means is a lower bearing device 210 fit on the outer circumference of the lower portion of the APC driving shaft 30 and supporting the lower end portion of the APC driving shaft 30 in a state where it is fixed on the APC body 20.

Figure 6:
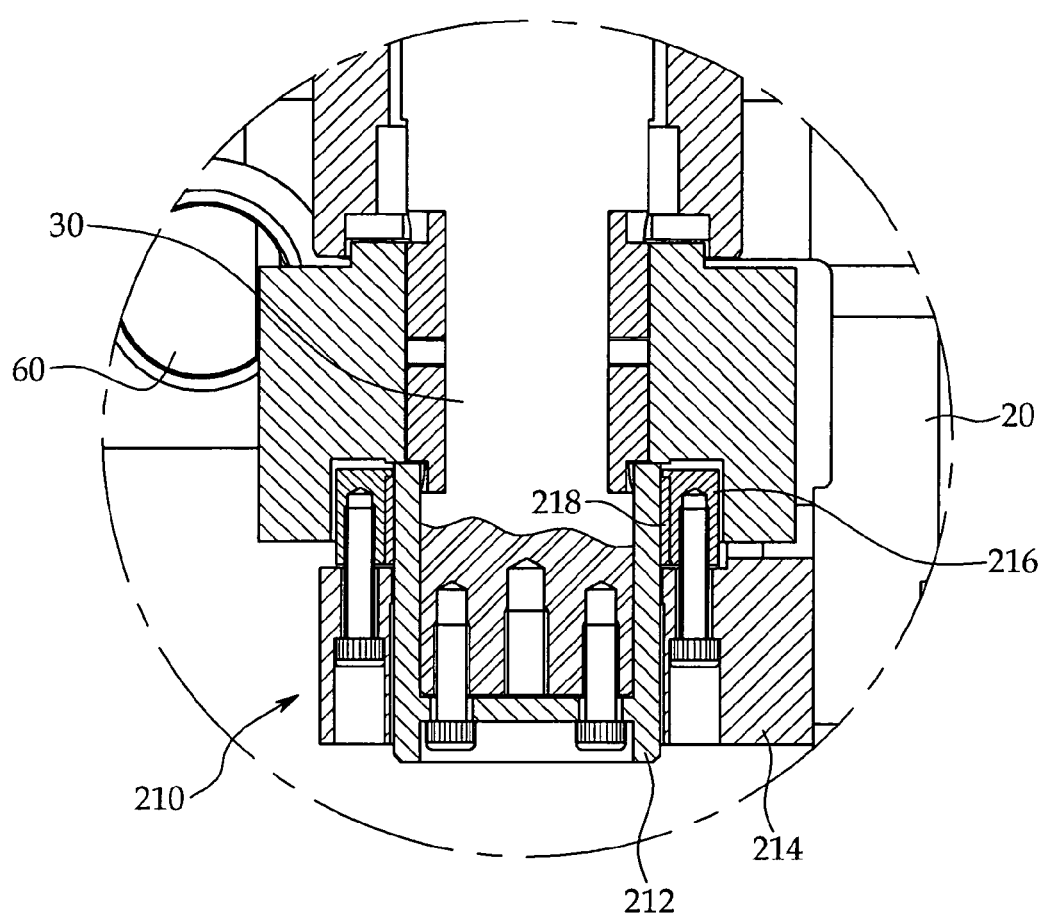
FIG. 6 is an enlarge view of a K part of FIG. 5.
Figure 7:
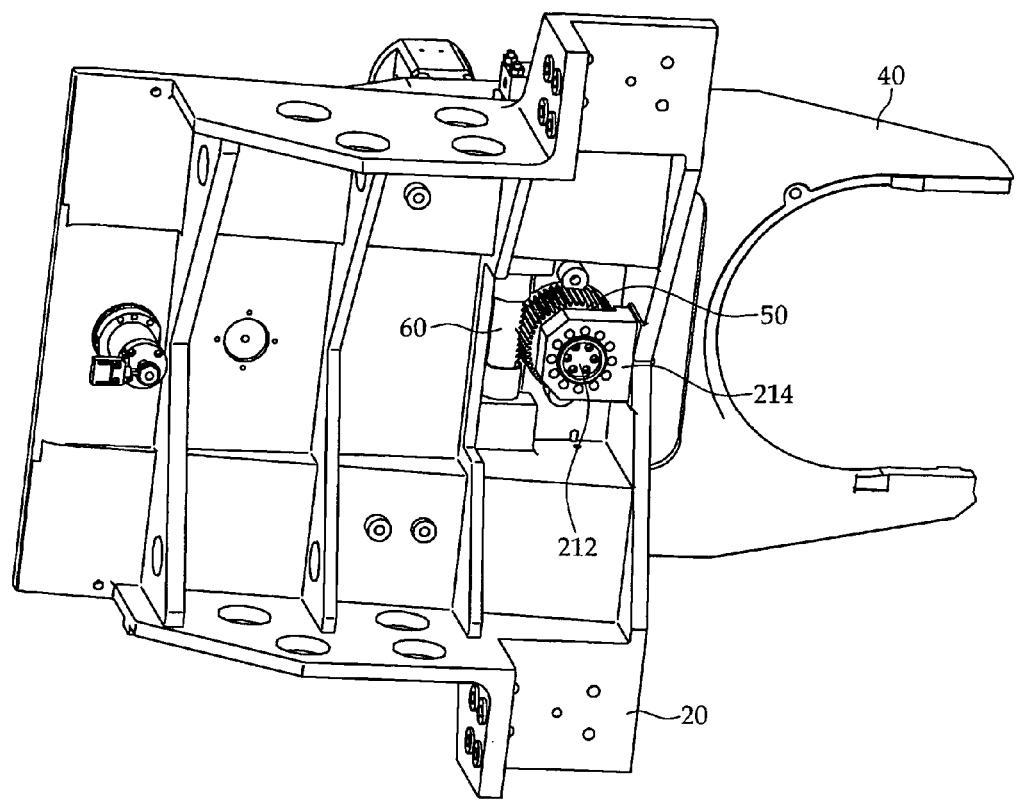
FIG. 7 is a perspective view seen from the bottom of the automatic pallet exchanger of the machine tool according to the present invention.

FIGS. 6 and 7 show the lower bearing device 210. FIG. 6 is an enlarged view of a K part of FIG. 5, and FIG. 7 is a perspective view seen from the bottom of the pallet exchanger of the machine tool according to the present invention.

The lower bearing device 210 is located beneath the APC driving shaft 30, and includes a housing bracket 214 fixed on the APC body 20, a bearing housing 216 fixed on the housing bracket 214, and an indent bearing 218 interposed between the inner circumference of the bearing housing 216 and the outer circumference of the APC driving shaft 30.

Meanwhile, the APC driving shaft 30 further includes abrasion preventing means for preventing abrasion due to friction with the indent bearing 218 when the APC driving shaft 30 is rotated and elevated.

In the present invention, the abrasion preventing means is a cylindrical guide 212 mounted between the inner circumference of the indent bearing 218 and the outer circumference of the APC driving shaft 30.

The indent bearings 200 and 218 can always maintain uniform lubrication by an indent carved in the bearing surface, and can select one of an indent type, a perforate type, a seal mounting type, a groove type and a filling type.

Hereinafter, an operation of the present invention will be described.

First, as shown in FIG. 2, before the exchanging operation of the APC arm 40, one stop bolt 110A is controlled in its position in a state where the APC arm 40 is seated on a rotating pin 5. That is, as shown in FIG. 3, the stop bolt 110A is controlled in such a way that the front end surface of the stop bolt 110A is in contact with a side flat surface 110a of the stopper 100, and then, firmly fixed with the nut 130A.

Next, the APC arm 40 is rotated at an angle of 180° to control the position of the other stop bolt 110B. When the APC arm 40 is rotated at the angle of 180°, as shown in FIG. 4b, the other side flat surface 110b of the stopper 100 approaches the front end surface of the stop bolt 110B. In the above state, the stop bolt 110B is controlled in such a way that the front end portion of the stop bolt 110B is in contact with the flat surface 110b, and then fixed with the nuts 130A and 130B.

Then, the position control of the stop bolts 110A and 110B is completed.

When the position control of the stop bolts 110A and 110B opposed to each other is completed, the pallet exchange is always carried out precisely and stably at a fixed position without regard to backlash of the rack 60 and the pinion gear 50 at the time of the pallet exchange of the APC arm 40.

Moreover, the upper indent bearing 200 and the lower indent bearing 218 mounted at the upper and lower portions of the APC driving shaft 30 guide and support the elevating operation of the APC driving shaft 30, and so, there is no partial side wear on the APC driving shaft 30 even though biased load is applied to the APC arm 40.

The above will be described according to the operation of the APC arm 40.

First, when an order to exchange the pallets respectively located in the waiting area and in the processing area (at this time, the flat surface 100a of the stopper 100 is in contact with the stop bolt 110A) is given, as shown in FIG. 5, pressure oil is supplied to a lower chamber (U) of the cylinder 80 and the piston 90 ascends.

By the ascending operation of the piston 90, the APC driving shaft 30 and the elevating cylinder housing 92 are simultaneously moved upwardly. At this time, the elevating cylinder housing 92 ascends by guidance and support of the upper indent bearing 200, and the APC driving shaft 30 ascends by guidance and support of the lower indent bearing 218.

Next, pressure oil is supplied to the index cylinder 70, and as shown in FIG. 4, the rack 60 performs a straight motion, and rotational force is transferred to the pinion gear 50 engaged with the rack 60, and then, the APC driving shaft 30 is rotated integrally with the APC arm 40. FIG. 4a shows a state where the APC arm 40 is rotated at an angle of 90° and FIG. 4b shows a state where the APC arm 40 is rotated at an angle of 180°.

When the APC arm 40 is rotated, as shown in FIG. 4a, also the stopper 100 is rotated on the APC driving shaft 30. As shown in FIG. 4b, when the APC arm 40 reaches the position of the angle of 180°, the flat surface 110b of the stopper 100 is in contact with the stop bolt 110B located at the other side of the stopper, and the APC arm 40 is stopped at the 180° rotation position without the backlash.

When the order to exchange the pallets is given, fluid injecting means injects fluid in order to remove foreign substances stained on the contact portion between the stop bolts 110A and 110B, so that the pallets can be exchanged at a more exact position.

The fluid is one of cutting oil, air and oil mist which can be properly selected according to work conditions. For an example, if the fluid is air, the injecting means generally uses the air nozzles 140A and 140B, and injects compressed air in order to remove the foreign substances stained on the contact portion between the stopper 100 and the stop bolt 110B.

Next, as shown in FIG. 5, pressure oil is supplied to the upper chamber (D) of the cylinder 80, and thereby, the piston 90, the APC driving shaft 30, the elevating cylinder housing 92 and the APC arm 40 are lowered at the same time and seated on the locating pin 5. Even when the APC arm 40 is lowered, the APC arm 40 is slidably guided and supported by the upper indent bearing 200 and the lower indent bearing 218.

Meanwhile, to transfer the pallet located in the processing area to the waiting area, the APC arm 40 is rotated in the contrary direction to the above direction so that the APC arm 40 is stopped at a fixed position when the flat surface 100a of the stopper 100 is in contact with the APC arm 40 by the stop bolt 110A.

As described above, according to the automatic pallet exchanger of the machine tool, the APC arm 40 is rotated by converting the rectilinear motion of the rack 60 into the rotational motion of the pinion gear 50, and then, stopped at the fixed position by the stopper 100 and the stop bolts 110A and 110B without engagement. As a result, the present invention can provide a correct position decision and good durability of the APC driving parts without vibration.

Furthermore, even though biased load is applied to the APC arm 40, the present invention can prevent the partial side wear and leaning of the operation surfaces of the APC driving parts by the guiding and supporting force of the upper and lower indent bearings 200 and 218 mounted at the two places even during the rotation and the elevation of the APC arm 40, thereby improving stability in the pallet exchanging operation.

As described above, the automatic pallet exchanger of the machine tool according to the present invention can decide the exchange stop position of the APC arm by the stopping means without engagement, thereby stably performing the exchanging operation of the pallets at the correct position, and improving stability in operation and a degree of processing of the APC by increasing bearing force by the indent bearings mounted at the two places.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. An automatic pallet exchanger of a machine tool for exchanging a pallet located in a processing area with a pallet located in a waiting area, comprising:
    an APC body;
    a cylinder having an outer circumference and an end which is fixed to the APC body;
    a movable unit supported on the APC body and the cylinder and including an elevating cylinder housing, which surrounds at least a portion of the cylinder and which includes an inner circumference, a piston, which extends through the cylinder, an APC driving shaft, which extends through at least a portion of the piston, and an APC arm, which is fixed to the elevating cylinder housing for supporting a pallet thereon, the movable unit being rotatable and elevatable relative to the APC body and the cylinder for moving a pallet supported on the APC arm;
    an upper bearing interposed between the outer circumference of the cylinder and the inner circumference of the elevating cylinder housing; and
    a lower bearing provided below the upper bearing between a lower portion of the APC driving shaft and the APC body, the upper and lower bearings rotatably and elevatably supporting the movable unit on the cylinder and the APC body, respectively, so as to permit rotational and elevating movements of the movable unit, the upper and lower bearings providing two bearing points for counteracting an unbiased load applied to the APC arm so as to inhibit the APC driving shaft from undergoing partial side wear,
    wherein the APC arm further comprises:
    a stopper fixed beneath the APC driving shaft; and
    stopping means fixed to the APC body for stopping the rotation of the APC arm at a fixed position.

2. An automatic pallet exchanger of a machine tool according to claim 1, wherein the rotating means includes a pinion gear mounted at the lower portion of the APC driving shaft and a rack mounted in an index cylinder for engagement with the pinion gear; and wherein the stopping means comprises stopper blocks fixed on the APC body and stop bolts fastened to the stopper blocks by nuts for position control for inhibiting backlash occurring at the time of engagement of the pinion gear with the rack.

3. An automatic pallet exchanger of a machine tool according to claim 2, wherein each of the stopper blocks includes applying means for applying pressurized fluid against contact portions of the stopper and a corresponding one of the stopper blocks so as to remove foreign substances therefrom.

4. An automatic pallet exchanger of a machine tool according to claim 1, wherein the lower bearing includes a housing bracket fixed to the APC body, a bearing housing fixed to the housing bracket, and a bearing ring mounted on the lower potion of the APC driving shaft for engaging the bearing housing so as to permit rotational and elevational movements of the APC driving shaft relative to the APC body.

5. An automatic pallet exchanger of a machine tool according to any one of claims 1 and 4, wherein the lower bearing is any one selected from the group of an indent type, a perforate type, a seal mounting type, a groove type and a filling type.

6. An automatic pallet exchanger of a machine tool according to claim 4, wherein the APC driving shaft further comprises abrasion preventing means for preventing abrasion of the APC driving shaft by friction with the bearing ring of the lower bearing when the APC driving shaft is rotated and elevated, said abrasion preventing means including a cylindrical guide interposed between an inner circumference of the bearing ring and an outer circumference of the APC driving shaft.

\* \* \* \* \*